US011853467B2

(12) United States Patent
Dahan et al.

(10) Patent No.: US 11,853,467 B2
(45) Date of Patent: Dec. 26, 2023

(54) METHOD FOR BLURRING AND UNBLUR VIDEOS AND PHOTOS IN MESSAGES BOX OF A COMMUNICATION APPLICATION

(71) Applicants: Meir Dahan, Tveria (IL); Eliahu Antopolsky, Zichron Yaakov (IL)

(72) Inventors: Meir Dahan, Tveria (IL); Eliahu Antopolsky, Zichron Yaakov (IL)

( * ) Notice: Subject to any disclaimer, the term of this patent is extended or adjusted under 35 U.S.C. 154(b) by 0 days.

(21) Appl. No.: 18/092,479

(22) Filed: Jan. 3, 2023

(65) Prior Publication Data

US 2023/0153473 A1    May 18, 2023

Related U.S. Application Data

(63) Continuation-in-part of application No. 17/746,966, filed on May 18, 2022, now Pat. No. 11,586,767, which is a continuation-in-part of application No. 16/879,759, filed on May 21, 2020, now abandoned.

(51) Int. Cl.
*G06F 21/84* (2013.01)
*H04N 5/91* (2006.01)
*G06T 5/00* (2006.01)
*G06F 3/04845* (2022.01)
*G06F 3/04886* (2022.01)

(52) U.S. Cl.
CPC .......... *G06F 21/84* (2013.01); *G06F 3/04845* (2013.01); *G06F 3/04886* (2013.01); *G06T 5/002* (2013.01); *H04N 5/91* (2013.01); *G06T 2200/24* (2013.01); *G06T 2207/10016* (2013.01)

(58) Field of Classification Search
CPC ............ G06F 3/04845; G06F 3/04842; H04N 21/8153; H04N 21/41407; H04N 21/4788
See application file for complete search history.

(56) References Cited

U.S. PATENT DOCUMENTS

| | | | |
|---|---|---|---|
| 7,996,469 B1* | 8/2011 | Wang ...................... | H04L 51/04 709/204 |
| 9,608,964 B2* | 3/2017 | Stutch ................... | H04L 63/105 |
| 9,979,684 B2* | 5/2018 | Sayko ................ | H04N 21/4788 |
| 10,931,728 B1* | 2/2021 | Barnett ................. | H04L 65/765 |
| 2015/0172238 A1* | 6/2015 | Ahmed .............. | H04N 21/4223 709/217 |
| 2015/0242104 A1* | 8/2015 | Stokman .............. | G11B 27/031 707/706 |
| 2016/0294750 A1* | 10/2016 | Ansari ................ | G06F 3/04845 |
| 2018/0019962 A1* | 1/2018 | Sayko ...................... | H04L 51/52 |
| 2018/0063582 A1* | 3/2018 | Cummins ................ | H04N 7/14 |
| 2019/0182549 A1* | 6/2019 | Grossman .......... | H04N 21/4627 |
| 2020/0026783 A1* | 1/2020 | Watanabe ............. | G06F 16/176 |
| 2020/0403956 A1* | 12/2020 | Adamski ................. | H04L 51/52 |

* cited by examiner

*Primary Examiner* — Esther B. Henderson

(57) ABSTRACT

A method for managing privacy of videos and photos recorded through a communication application by displaying a recording button on the touch screen of the user's mobile device, recording the video or photo and displaying it in the message box of the user and the contact, displaying on the mobile devices a blur button that is associated with the video or photo, applying on the video or photo a blur mode for blurring the video or photo, displaying on the mobile devices an unblur button that is associated with the blurred video or photo, applying an unblur mode on the blurred video or photo by using the unblur button on the user's mobile device when the blur mode was applied by the user's or by using the unblur button on the contact's mobile device when the blur mode was applied by the contact's mobile device.

2 Claims, 2 Drawing Sheets

METHOD FOR BLURRING AND UNBLUR VIDEOS AND PHOTOS IN MESSAGES BOX OF A COMMUNICATION APPLICATION

RELATED APPLICATIONS

This application is a continuation in part of U.S. patent application Ser. No. 17/746,966 filed on May 18, 2022, which is a continuation in part of U.S. patent application Ser. No. 16/879,759 filed on May 21, 2020.

TECHNICAL FIELD

The present invention refers to a method for managing and protecting privacy of videos and photos recorded through a communication application.

BACKGROUND ART

Many users of mobile devices like to send to each other photos, video files or audio files. Sometimes the user wants to send to his contact such a file that contains sensitive information that the user would prefer that the contact will be unable to save the file, to forward it and to make a screenshot or screen recordation of the photo or the video. In addition, users of mobile devices are afraid to take pictures or to make videos of certain situations because they know that the files of these photos and videos are saved on the mobile device and third person can see them, even if they delete the files from the phone, and hackers or authorities may access their mobile and expose those files. The present invention provides a solution for such problems.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

The term "mobile device" refers to any kind of mobile device, smartphone, tablet or a computer that is designed to have an internet connection and a camera. The term "processing device" refers to a processing device on a server or on the mobile devices, or both.

The main object of the present invention is to provide a method for managing and protecting privacy of recorded or shared videos and photos files that is performed by processing devices (10) running on a mobile device (100) of a user, on a mobile device (200) of a contact of a communication application and on a remote server (300). It is possible to implement the present invention to several kinds of files, such as files of video films, files of audio recordings and photographs files, and the terms "video" and "photo" hereinafter and in the claims refers to video films, photos and audio recordings, and the term "shooting" means also taking or recording.

Figure 1:
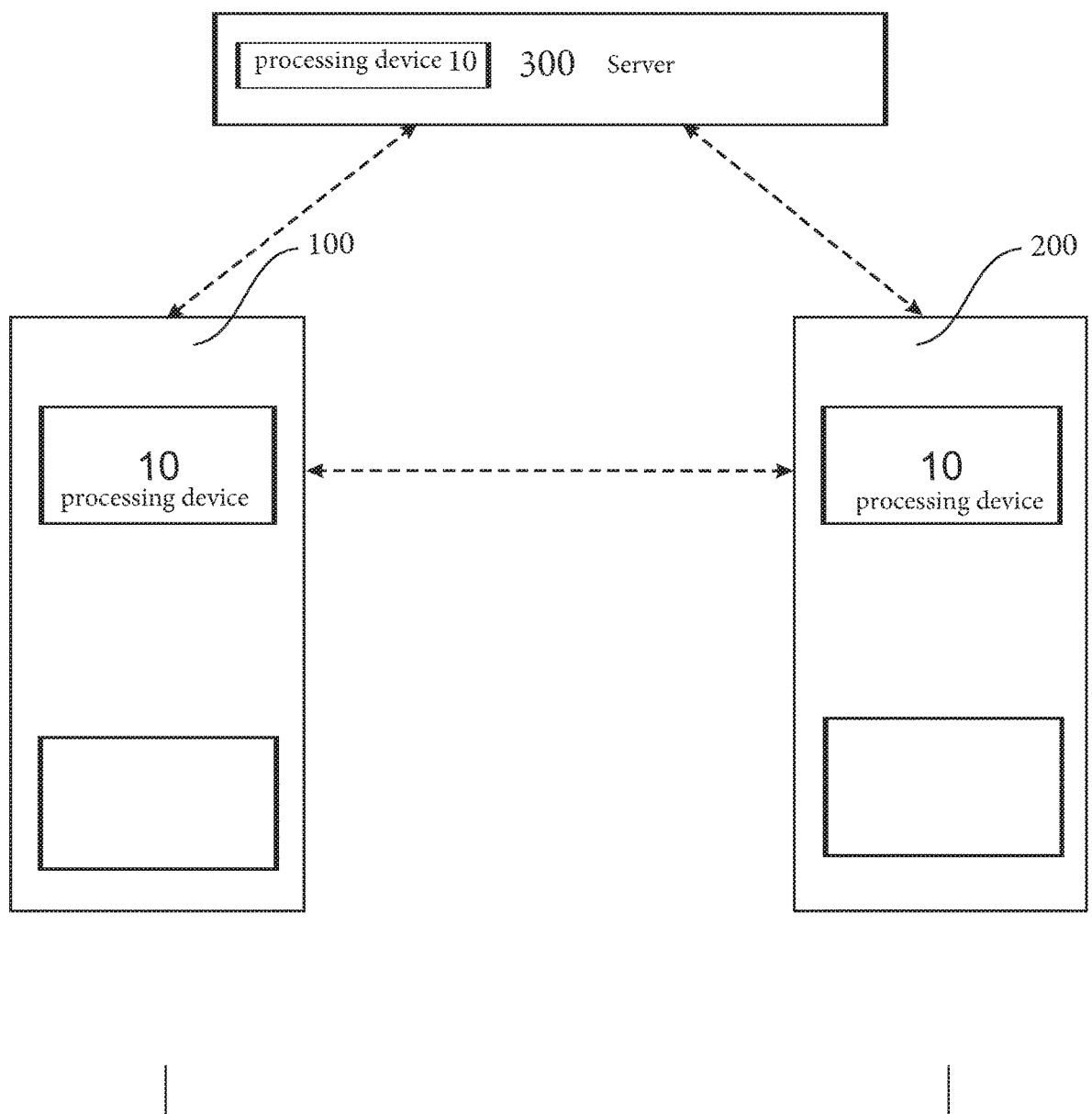
FIG. 1 is a block diagram that shows the mobile device of the user (100), the mobile device of the contact (200) and the remote server (300), each one of them with a processing device (10).
Figure 2:
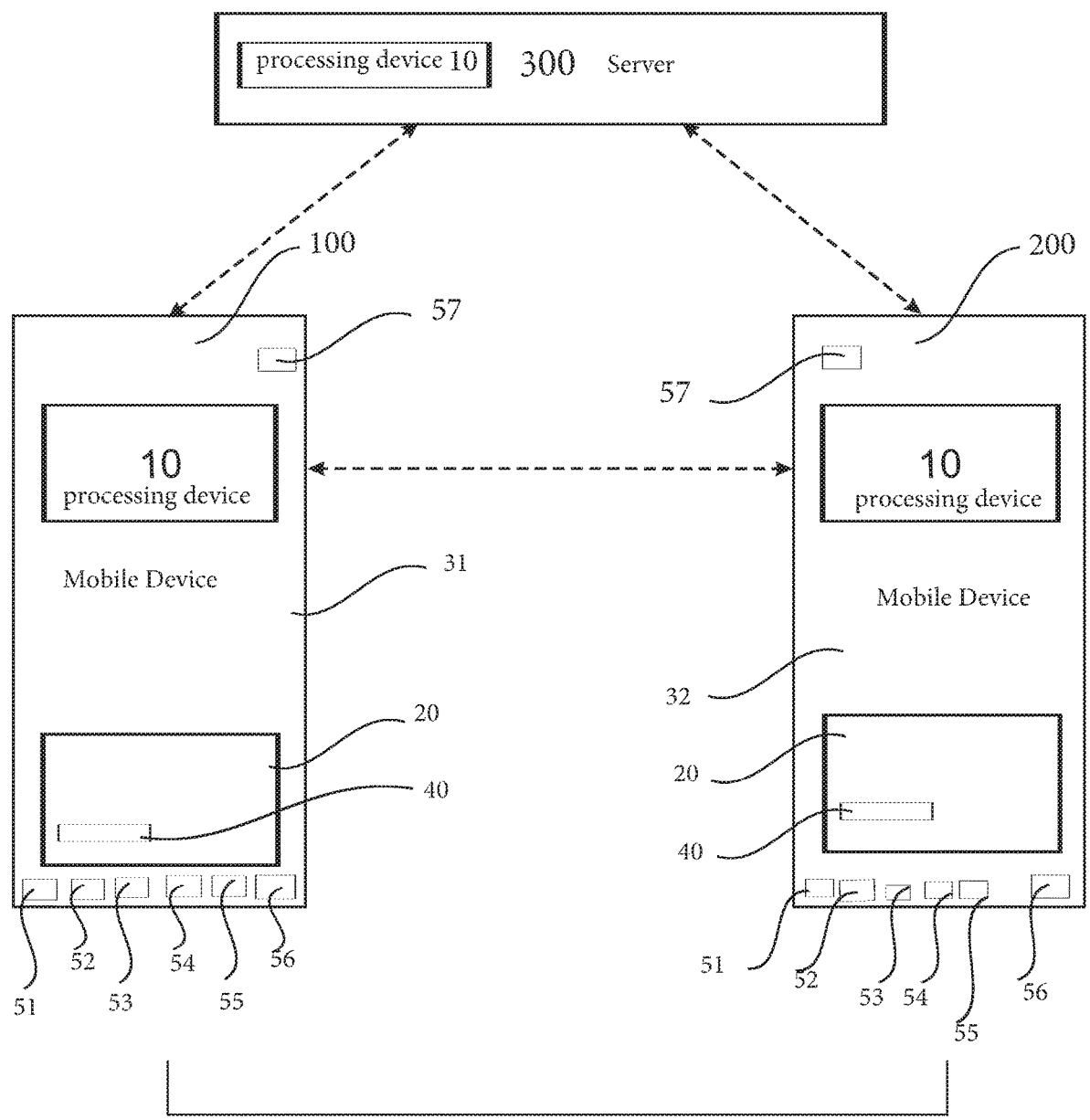
FIG. 2 depicts the mobile devices of the user (100) and the contact (200) with the blur and unblur buttons.

FIG. 1 depicts schematically the mobile devices of the user (100), of the contact (200) and the remote server (300), each one of them with a processing device (10), and FIG. 2 depicts the mobile devices of the user (100) and the contact (200) with the blur and unblur buttons.

The present invention refers to a method for managing privacy of a video or a photo recorded through a communication application that is performed by processing devices running on the mobile devices of a user and of a contact of the communication application. The method may include one or more of the following features:

(a) Displaying a recording button (53) on the touch screen (31) of the user's mobile device (100).

(b) Recording a video or a photo that is designed to be displayed in the message box (20) of the user and the contact in the communication application. The recording can be executed by using the recording button.

(c) Displaying in the message box the recorded video or photo that can be viewed on the touch screens of the mobile devices of the user and the contact.

(d) Displaying on the touch screen of the user's mobile device and on the touch screen of the contact's mobile device a blur button (54) that is configured to be associated with the recorded video or photo.

(e) Applying on the recorded video or photo a blur mode that is applied by using the blur button on the user's touch screen or by using the blur button on the contact's touch screen. The application of the blur mode on the recorded video or photo is configured to blur the recorded video or photo. The target is to enable the user and also the contact to blur videos and photos that are displayed in their message box (the message box is in fact is a semi joint message box) so that they can take videos and photos together by using the mobile device of one of them (can be by using the recording button (53)) so that the videos and the photos can be blurred by each one of them so that each one of them, independently, can apply the blur mode.

(f) Displaying on the touch screen of the user's mobile device and on the touch screen of the contact's mobile device an unblur button (55) that is configured to be associated with the blurred video or photo.

(g) Applying on the blurred recorded video or photo an unblur mode that is applied on the blurred recorded video or photo by using the unblur button (55) on the touch screen of the user's mobile device when the blur mode was applied by the user's mobile device or by using the unblur button on the touch screen of the contact's mobile device when the blur mode was applied by the contact's mobile device. The application of the unblur mode is configured to unblur the blurred recorded video or photo so that the recorded video or photo can be viewed on the mobile device of the user and of the contact.

In such cases the user and the contact may wish that none of them may save or forward the recorded video or photo, and therefore the method may further includes the steps of displaying a privacy button (56) on the touch screen of the user's mobile device, and applying on the recorded video or photo a privacy mode that is applied by using the privacy button (56). The application of the privacy mode on the recorded video or photo can be also automatically without using any button and is configured to cause the mobile devices to disable a possibility of the mobile devices to execute a screenshot and screen recording of the recorded video or photo, to disable a possibility of the mobile devices to save the recorded video or photo in the galleries (57) of the mobile devices, and to disable a possibility of the mobile devices to share and forward the recorded video or photo.

It should be noted that it is possible that one icon will serve as two or more buttons. For example, the blur button (54) after being activated (after blurring the video or the photo) can be changed and looks differently and serve as the unblur button (55). In addition, the buttons can be hidden in the meaning that the function of the buttons can be done simply by tapping on the touch screen or on part of it. For example, tapping twice on the video or photo will blur it and tapping twice on the blurred video or photo will unblur it. The term "a video" in this disclosure and in the claims refers also to "a photo" and the claims and the disclosure should be read and understood as applied to photos as well.

Another aspect of the present invention refers to a method for managing privacy of a video or a photo that is sent from a user to a contact through a communication application that is performed by processing devices (10) running on mobile devices of the user and the contact (100) and (200) of the communication application, and this method comprised the following steps:
- (A) Sending from the user's mobile device (100) to the contact's mobile device (200) a video or a photo that is designed to be displayed in the message box (20) of the user and the contact in the communication application.
- (B) Displaying in the message box the video or photo that is designed to be viewed on the touch screen (31) of the user's mobile device and on the touch screen (32) of the contact's mobile device.
- (C) Displaying on the touch screen of the user's mobile device a blur button (54) that is configured to be associated with the video or photo.
- (D) Applying on the video or photo a blur mode that is applied by using the blur button on the user's touch screen. The application of the blur mode on the video or photo is configured to blur the video or photo in the message box in the contact's mobile device.
- (E) Displaying on the touch screen of the user's mobile device an unblur button (55) that is configured to be associated with the blurred video or photo.
- (F) Applying on the blurred video or photo an unblur mode that is applied on the blurred video or photo by using the unblur button on the touch screen of the user's mobile device. The application of the unblur mode is configured to unblur the blurred video or photo so that the video or photo is can be viewed on the mobile device of the contact.

The user can send to the contact in the communication application a phot ore video by using the privacy mode as explained above, and in addition to that the user can blur and unblued photos and videos that he has sent to the contact while these photos and videos are in the message box. In this way the contact can see in the dialog box the photos and videos that he received from the user, although they are in a blurred state, and the user can control the state of the photos and videos (blur or unblur), according to his sole desire. All that while knowing that the contact cannot take a screenshot, save the photo or the video in the gallery (57) or forward it, as explained above. This in a contrary to the first option when the user or the contact make a video or take photos by using the button in the message box, that make these videos and photos as a common videos and photos, means that they both 'own' these videos and photos and therefore they both have the control to blur and unblur them.

The method subject matter of the present invention may be executed by a software application, such as a smartphone application, that may include one or more of the following features:
- (a) The method enables the first user and the second user to create a virtual group with a shared dialog box (20) (or a message box that both the user and the contact can see on their mobile devices) that is designed to be displayed on the touch screens (31) (32) of the mobile devices (100) and (200) of the first and the second users. For example, it is possible that the first user will find the second user in the software application by a code or his or her phone number, as it is for example in Telegram™, WhatsApp™ and the like.
- (b) The first user can open the software application on his mobile device and take a photo, shoot a video or record an audio by employing the camera and the recording system of his mobile device. It is possible that when the first user open the software application on the screen of his mobile device he will see relevant icons such as "photo" "video" "voice" for taking a photo, for shooting a video and for voice recording. Then, the software application stores the file of the video film that the first user shoots by his mobile device solely and only on the remote server (300). In this way, the first user feels safe and knows that if someone will steal his mobile device then the thief can't see the files and the video film, due to the fact that the files are not stored in the mobile device itself. Note, that it is possible that to enter the software application form the mobile device of the user will require a password.
- (c) The method may displays on the dialog box (20) a link (40) to the file, which is stored on the remote server (300). The first user can view the video film, possible simply by pressing or touching the link and he may delete the link when he wishes to do so. It is possible that the link will be not only in the shared dialog box of the first user with his contact, means the second user, but also in a private library on his mobile device that include links of such video films that the first user may take from time to time, and in this way the first user may delete the link form the shared dialog box with his contact but to keep the link in his private library for future viewing.
- (d) The method enables the second user to select for viewing the link that is displayed on the shared dialog box. This may be possible for example simply by pressing or touching the link on the screen.
- (e) The method streams the video film from the server to the mobile device of the second user and plays it on the screen of the mobile device of the second user upon executing the selection for viewing as explained above. It is possible that the method may include a feature so that the video film can be streamed and played on the screen of the mobile device of the second user only when the first user is online and in the shared dialog box, and by that the first user can make sure that the second user may watch the video film only in times that the first user agree and can control. But, it is possible that the method will able an option that the second user will have the ability to watch the vide film as long as the link is still in their shared dialog box, and in anyway the first user can delete this link whenever he wants.
- (f) The method prevents the ability of the mobile device of the second user to make a screenshot when playing the video film on its screen, and by that the first user knows that the video film is safer. Indeed, the second user may make a photo of his mobile device by another camera, but this is a risk that the first user may take when the sensitivity of the video film is important but not extremely high.

(g) The method prevents the abilities of the mobile device of the second user to save the file, to share the file or to forward the file to another people. This is a part of making the first user to feel surer that his video film will not be saved and distributed.

(h) The method may also provide to the first user an option to set the file in a free mode or in a conjointly mode. Thus, upon setting the file in the conjointly mode, the method enables to display the link on the shared dialog box or enables the streaming and playing of the video film on the screen of the mobile device of the second user only when the first user is online or is online and in the shared dialog box. Or, upon setting the file in the free mode, the method enables to stream and play the video film on the mobile device of the second user, also when the first user is offline.

The first user can shoot a video that is not going to be saved on his mobile device but only in the remote server, to put a link in the shared dialog box with his contact (second user), and enable the second user to watch the video, knowing that the contact cannot save the file nor forward it, and the first user can at any time delete the link from the shared dialog box, and by that disabling the second user from watching the video again. This method allows users to transfer files more securely to one another.

Another version of the method, which is narrower, may include the ability to shoot the video film by employing the existing camera and voice recording means of the mobile device of the user and storing solely on the remote server the file of the video film that the user shoots by his mobile device, displaying on the screen of the mobile device the link to the file that is stored on the remote server, and enabling the user to select for viewing the link and playing the video film on the screen of the mobile device. In this way, the user may take photos, videos or make voice recordings and he feel safe that in case someone will steal his mobile device that person cannot view these files.

The present invention refers also to a method for managing privacy of a video or a photo recorded through a communication application that is performed by the processing devices (10) running on a server (300) and on the mobile devices of a user and of a contact of the communication application. The method includes the followings steps:

The method subject matter of the present invention is designed primarily to be implemented in new or existing instant messaging software applications (communication applications) such as Telegram™, WhatsApp™ and the like. The method may include one or more of the following features:

(a) Displaying a (secret) recording button (51) on the touch screen (31) of the user's mobile device (100). The term "button" in this application means any icon or digital button seen on the touch screens of the mobile devices that enable the users to take actions by touching, tapping or simply using that buttons and the term "using" when related to such button means for example any kind of way that activate the button such as clicking, touching, tapping and the like.

(b) Recording a video or a photo by the user's mobile device (100) that is designed to be displayed in the message box (20) of the user and the contact in the communication application, and applying on the recorded video or photo a re-watch mode by using the secret recording button (51).

The term "message box" (20) means the digital place that the text messages and the images (photos, videos and files) (and other messages such as voice message and media) are placed in the screen of the user and the contact when they are in a chat one with the other, and also any other digital place in which the user and the contact can see for example the media that they sent one to the other through the communication application, such media includes photos, videos, documents and links that the user and the contact sent to each other through that communication application.

(c) Displaying in the message box the recorded video or photo that can be viewed on the touch screen (31) of the user's mobile device (100) and on a touch screen (32) of the contact's mobile device (200).

(d) The re-watch mode that is applied on the recorded video or photo is configured to cause the user's mobile device or the contact's mobile device to transmit the recorded video or photo to the server (300), and to cause the server to save the recorded video or photo in the server.

(e) Displaying on the touch screen of the user's mobile device and on the touch screen of the contact's mobile device a re-watch button (52) that is configured to be associated with the recorded video or photo.

(e) Sending to the server a digital re-watch command from both mobile devices of the user and of the contact by using the re-watch button.

(f) Receiving from the server the recorded video or photo that was stored on the server to the mobile devices of the user and the contact.

(g) Posting in the message box the recorded video or photo that was received from the server by using the mobile devices of the user and the contact that digitally post in said message box of the user and the contact the recorded video or photo upon receipt of the digital re-watch command received from both mobile devices of the user and of the contact.

The user and the contact can be together for example and decide to shoot a video or to take a photo. They can shoot the video or photo by one of their mobiles but through the message box of their communication application. Means, like when the user wants to write a text message to his specific contact he opens the chat with the contact and then normally he can see several buttons such as an icon for recording a voice message, an icon for recording a video message, an icon for sending emojis and gifs, an icon for attaching photos and files, a place for writing a text message and the like. In our invention, the communication application may have additional icons (button) for the (secret) recording button (51), for applying the blur and unblur mode, privacy and the like.

What is claimed is:

1. A method for managing privacy of a video or a photo recorded through a chat between a user and a contact of a communication application that is performed by processing devices running on mobile devices of the user and the contact, said method comprising:

displaying a recording button on a touch screen of the user's mobile device that is configured to record the video or photo, wherein said video or photo is designed to be displayed in the chat of the user and the contact in the communication application;

displaying in the chat of the user and the contact in the communication application the video or photo that was recorded by the user's mobile device and that is designed to be viewed on the touch screen of the user's mobile device and on a touch screen of the contact's mobile device;

displaying on the touch screen of the user's mobile device and on the touch screen of the contact's mobile device a blur button that is configured to be associated with the recorded video or photo;

applying on the recorded video or photo a blur mode by using the blur button on the user's touch screen or by using the blur button on the contact's touch screen, wherein the application of the blur mode on the recorded video or photo is configured to blur the recorded video or photo on the mobile device of the user or on the mobile device of the contact or on both;

displaying on the touch screen of the user's mobile device and on the touch screen of the contact's mobile device an unblur button that is configured to be associated with the blurred video or photo;

applying an unblur mode on the blurred video or photo by using the unblur button on the touch screen of the user's mobile device when the blur mode was applied by the user's mobile device or by using the unblur button on the touch screen of the contact's mobile device when the blur mode was applied by the contact's mobile device; wherein the application of the unblur mode is configured to unblur the blurred video or photo so that the recorded video or photo is designed to be viewed on the mobile devices of both the user and the contact.

2. The method for managing privacy of a video or a photo of claim 1 that further includes a step of disabling a possibility of said mobile devices to save said recorded video or photo in galleries in said mobile devices.

* * * * *